(12) United States Patent
Monsen et al.

(10) Patent No.: US 7,699,357 B2
(45) Date of Patent: Apr. 20, 2010

(54) COUPLING FOR TUBES

(75) Inventors: Alf Greve Monsen, Raufoss (NO); Tore Slattsveen, Raufoss (NO)

(73) Assignee: Raufoss Water & Gas AS, Raufoss (NO)

( * ) Notice: Subject to any disclaimer, the term of this patent is extended or adjusted under 35 U.S.C. 154(b) by 84 days.

(21) Appl. No.: 12/027,081

(22) Filed: Feb. 6, 2008

(65) Prior Publication Data

US 2008/0191478 A1   Aug. 14, 2008

(30) Foreign Application Priority Data

Feb. 6, 2007   (NO) ................................. 20070685

(51) Int. Cl.
*F16L 21/06* (2006.01)
(52) U.S. Cl. .................. 285/322; 285/243; 285/341
(58) Field of Classification Search ................ 285/243, 285/322–323, 354, 386, 324, 341
See application file for complete search history.

(56) References Cited

U.S. PATENT DOCUMENTS

| | | | | |
|---|---|---|---|---|
| 2,394,351 | A * | 2/1946 | Wurzburger | 285/341 |
| 3,576,334 | A * | 4/1971 | Hemens | 285/222.4 |
| 4,229,025 | A * | 10/1980 | Volgstadt et al. | 285/105 |
| 4,627,644 | A * | 12/1986 | Ekman | 285/3 |
| 4,878,697 | A * | 11/1989 | Henry | 285/250 |
| 5,593,186 | A * | 1/1997 | Harris | 285/23 |
| 6,378,915 | B1 * | 4/2002 | Katz | 285/342 |
| 6,464,267 | B1 * | 10/2002 | Egozi | 285/342 |

(Continued)

FOREIGN PATENT DOCUMENTS

EP   0 583 707   8/1993

(Continued)

OTHER PUBLICATIONS

Norwegian Search Report for Norwegian Application No. 20070685, dated Sep. 6, 2007 (1 page).

*Primary Examiner*—Aaron M Dunwoody
*Assistant Examiner*—Fannie Kee
(74) *Attorney, Agent, or Firm*—Osha • Liang LLP

(57) ABSTRACT

A coupling includes a coupling housing and a coupling member. The coupling housing consists of a first housing part and a second housing part capable of being screwed together axially. Each of the first housing part and the second housing part has an internal conical surface, wherein, in a position that the first housing part and the second housing part are screwed together, the inner circumference of each of the internal conical surfaces generally lessen towards outward ends thereof, respectively. The coupling member is situated in the housing for clamping a tube inserted in the coupling housing. The coupling member is influenced axially by a conical clamping ring by cooperation with the conical surface in the first housing part and influences a resilient ring which causes sealing between the tube and the second housing part. One end of the coupling member is shaped as axial, flexible fingers separated by splits. As the first housing part and the second housing part are screwed together, the free ends of the fingers contact the resilient ring and are forced along the conical surface in the second housing part so as to force the resilient ring along the conical surface of the second housing part, whereby the resilient ring is compressed against the tube.

9 Claims, 2 Drawing Sheets

U.S. PATENT DOCUMENTS

| | | | |
|---|---|---|---|
| 6,991,265 B2 * | 1/2006 | Walmsley et al. | 285/316 |
| 2003/0197380 A1 * | 10/2003 | Chelchowski et al. | 285/354 |
| 2004/0155464 A1 * | 8/2004 | Slattsveen | 285/322 |
| 2006/0202478 A1 * | 9/2006 | Guest | 285/322 |

FOREIGN PATENT DOCUMENTS

| | | |
|---|---|---|
| GB | 1 214 889 | 11/1968 |
| WO | WO-99/20931 | 4/1999 |
| WO | WO-03/010461 | 2/2003 |

* cited by examiner

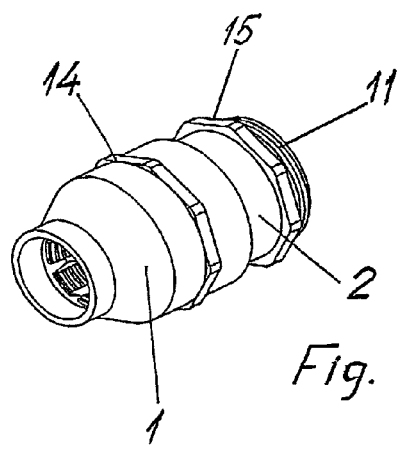
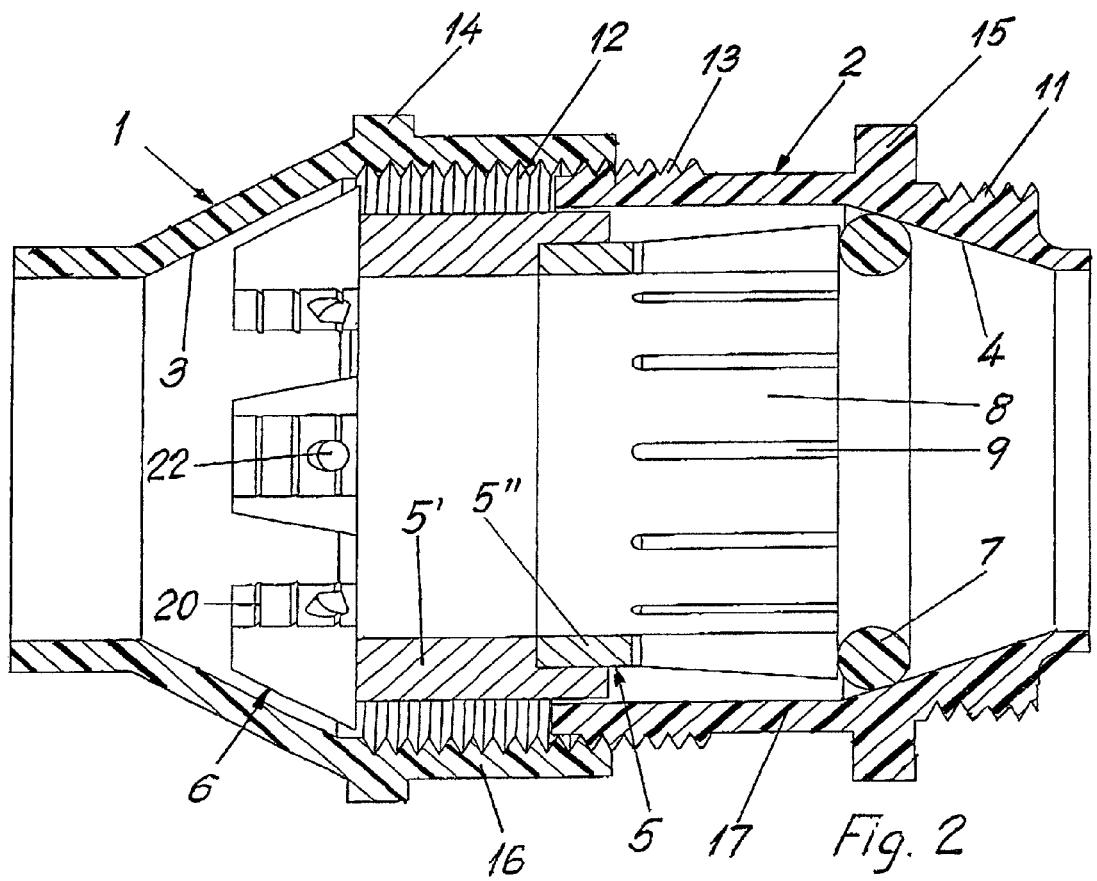

COUPLING FOR TUBES

BACKGROUND OF THE INVENTION

The present invention relates to a tube coupling.

Examples of couplings for clamping of tubes appear from WO 99/20931 and WO 03/010461. Both of the publications show a first housing part having internal threads and an internal conical surface, and a second housing part having external threads adapted to the threads in the first housing part. A split clamping ring, which during the screwing together of the housing parts is pressed against the conical surface in the first housing part, is compressed against the tube and immobilizes it. In WO 99/20931 the clamping ring is shown as a ring being split in such a manner that the ends thereof may pass each other, i.e. such that the ends overlap each other, when the ring has been sufficiently compressed. A resilient, sleeve shaped sealing ring is situated in a widened bore in the second housing part, and is compressed axially during increasing screwing together of the housing parts. In WO 03/010461 the clamping ring is shown as a ring being split transversely of the circumferential direction, and the split has a relatively large dimension in the circumferential direction, whereby there is room for compressing the ring until the ends near the split engage each other. A resilient sealing ring is situated innermost in a widened bore in the second housing part, and is compressed by a sleeve, against which the clamping ring is pressed during the screwing together of the housing parts. Moreover, the second housing part is symmetrical about a transversal middle plane, whereby another first housing can be screwed onto the other end of the second housing part, for clamping of a second tube; the coupling may in other words be used for coupling together of two tube ends.

Thus, the coupling member is able to adapt itself to tubes having different external diameters.

SUMMARY OF INVENTION

The coupling according to the invention is characterized in that one end of the coupling member is shaped as axial, flexible fingers separated by splits, whereby the free ends of the fingers may be forced in along the conical surface and force the resilient ring along the conical surface, whereby it is compressed against the tube, while the opposite end of the coupling member is influenced by a conical ring in engagement with the conical surface in the first housing part and causes an axial counter-force against the force exerted by the fingers against the conical surface in the second housing part and the sealing ring. Thereby, the fingers will be bent radially inwardly by being moved towards the narrowest end of the conical surface, and are able to clamp around an inserted tube with their free ends. This may take place with tubes having diameters within a certain range, from a largest diameter which just allows insertion of the tube in the coupling member and a smallest diameter towards which the inner side of the fingers can be bent.

The conical ring may be a separate ring engaging the coupling member. The ring may also be integral with the coupling member.

From reasons related to the technique of production the coupling member may be composed of two parts, a first part in the form of a sleeve engaging the conical ring and also acting as a guiding rest against one of the housing parts, and a second part having said splits in a large portion of its length and being radially spaced from the housing part in which it is situated. The two parts of the coupling member may for instance be interconnected in an interference fit. However, the interconnection is not critical, since the parts of the coupling member will be pressed axially together when the housing parts are screwed together.

In order to secure that the coupling member is under an axial strain when the housing parts have been screwed together and tightened, the coupling member may comprise slits in the circumferential direction. Each of these slits may extend only in a portion of the circumference and be mutually displaced in the circumferential direction, in such a manner that they extend along each other in a certain portion of the circumference. Those portions of the coupling member situated between the slits where these extend along each other form resilient bridges in the circumferential direction of the coupling member, whereby the coupling member may be slightly compressed axially by the tightening. Thereby, the coupling member will be kept in an inner strain upon tightening, in that the circumferentially extending slits are slightly compressed in width; i.e. in the axial direction of the coupling member. Two such slits are sufficient, but more than two slits may be used.

As mentioned, the coupling member may be used for tubes within a certain diameter range. As an example, one particular coupling member may be used for tubes within the diameter range of 27 to 34 mm. Thus, there is no need of a specific coupling for each tube dimension.

The coupling may be used for tubes made of all types of materials, incl. plastics, rubber, metals, metal alloys, steel etc.

The different parts of the coupling may be made of different materials, such as various metals and metal alloys and various types of plastics and composite materials.

BRIEF DESCRIPTION OF DRAWINGS

In the following the invention will be explained more detailed by means of examples, shown on the accompanying drawings.

FIG. 1 shows in a perspective view a coupling according to the invention, with the housing parts screwed together.

FIG. 2 shows an axial, longitudinal section through an embodiment of the coupling, incl. a clamping ring being a separate part; i.e. not being integral with the coupling member.

DETAILED DESCRIPTION

Figure 3:
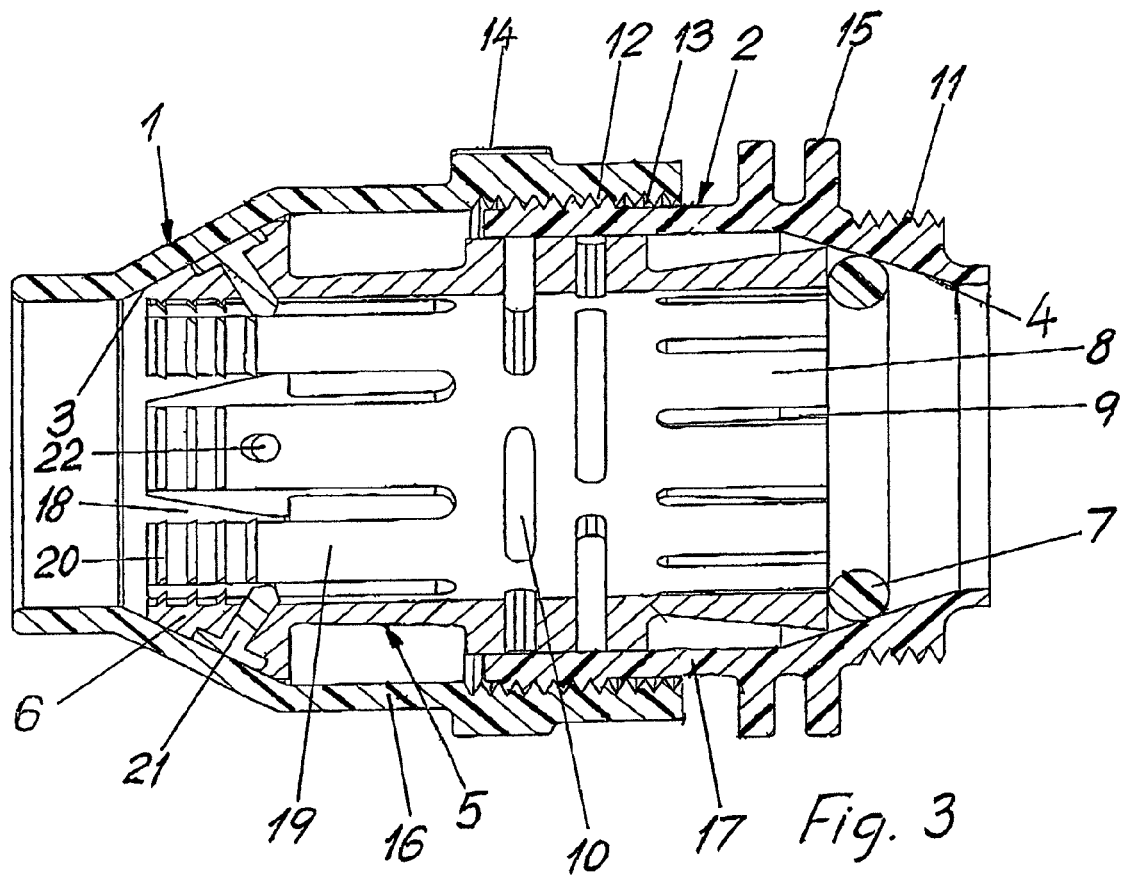
FIG. 3 shows an axial, longitudinal section through another embodiment of the coupling, incl. a clamping ring being integral with the coupling member.

FIG. 1 shows two housing parts 1 and 2, of which the housing part 2 has external threads 11 on one end, in order to be screwed together with any correspondingly threaded member. These threads may be replaced by any other suitable means of connection to another member.

In order to permit screwing together of the two housing parts 1 and 2, each of these are formed with a hexagonal portion 14 and 15, against which a wrench may clamp.

FIG. 2 shows an axial, longitudinal section through an embodiment of the coupling. A first housing part 1 has an internal conical surface 3, and is shaped with internal threads 12 in an annular portion 16. A second housing part 2 has an internal conical surface 4, and is shaped with external threads 13 in an annular portion 17 which can be screwed into the annular portion 16 of the first housing part 1. Moreover, the housing part 2 is shown as having an externally threaded portion 11, in order to be screwed together with any other correspondingly threaded member. As it appears better from FIG. 1, each housing part 1 and 2 has a hexagonal portion 14, 15.

The housing parts 1 and 2 contain a coupling member 5, a conical clamping ring 6 and a resilient ring 7, which may be an O-ring. The clamping ring 6 is situated along the conical surface 3, while the resilient ring 7 is situated along the conical surface 4.

The coupling member 5 is here, from reasons related to the technique of production, composed of two parts 5' and 5", this being of no importance to the functioning. The coupling member 5 includes a portion having longitudinal splits 9, whereby longitudinal fingers 8 are formed between the splits 9.

FIG. 2 shows the coupling in a first stage of screwing together of the housing parts 1 and 2. The ends of the fingers 8 are in engagement with the ring 7, but have not come into engagement with the conical surface 4. In this condition of the coupling a tube can be inserted into the coupling from any of the ends thereof. By continued screwing together upon insertion of the tube, the ends of the fingers 8 will come into engagement with the conical surface 4, and the fingers 8 will flex radially inwardly and come into engagement with the external surface of the tube. Simultaneously, the resilient ring 7 is forced to move along the conical surface 4, and comes into engagement with the external surface of the tube in order to cause sealing. At the opposite end of the coupling, inside the housing part 1, the screwing together will cause the clamping ring 6 to be compressed by being forced along the conical surface 3 as the space inside the coupling is shortened.

FIG. 3 shows another embodiment, which partly is similar to the embodiment of FIG. 2, in that it comprises two housing parts 1 and 2, internal conical surfaces 3 and 4, a coupling member 5, a clamping ring 6, a sealing ring 7, fingers 8 at one end of the coupling member 5, splits 9 between the fingers 8, external threads 11 on one end portion of the housing part 2, internal threads 12 in an annular portion 16 of the housing part 1 and external threads 13 on an annular portion 17 of the housing part 2. The coupling member 5 is also shown as having slits 10 in the circumferential direction. By the screwing together of the housing parts 1 and 2 these slits 10 can be compressed in the axial direction of the coupling member 5, and it may be achieved that the coupling member 5 remains in an axial strain.

Figure 4:
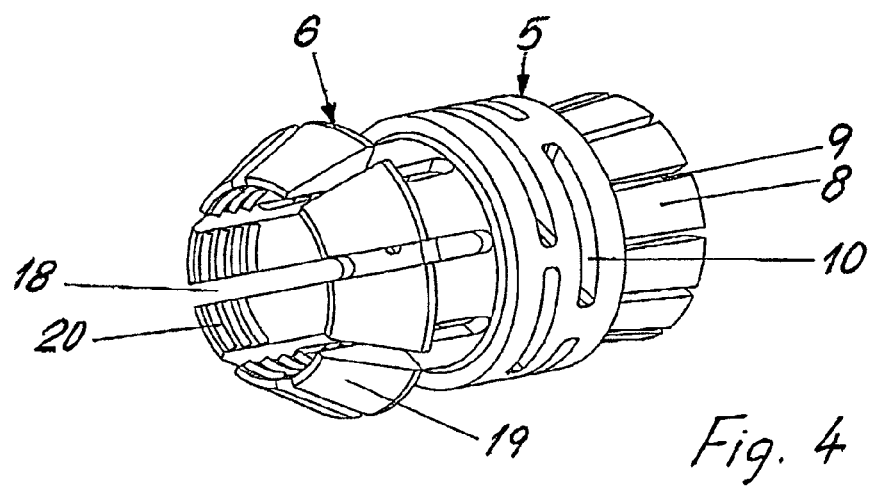
FIG. 4 shows in a perspective view a coupling member for use in a coupling according to the invention.

Here, reference is also made to FIG. 4, showing an embodiment of the coupling member 5 for use in a coupling according to the invention. The coupling member 5 corresponds to the embodiment which is incorporated in the coupling shown in FIG. 3.

Differently from the embodiment shown in FIG. 2 the clamping ring 6 is here, as it best appears from FIG. 4, integral with the remainder of the coupling member 5. In the area of the clamping ring 6, and almost to the middle of the coupling member 5, the coupling member 5 has splits 18, whereby also this end of the coupling member 5 has fingers 19 between the splits 18. For clamping of an inserted tube (not shown) the fingers 19 have internal ribs 20 in the circumferential direction of the coupling member 5. These ribs 20 may be pointed towards the top.

The primary function of the clamping ring 6 is to clamp a tube. The primary function of the fingers 8, which are forced into engagement with the conical surface 4 in the second housing part 2, is to force the sealing ring 7 along the conical surface 4, but they may also contribute to keeping the tube immobilized.

In FIG. 3 are shown nails 21 inserted through holes 22 in the clamping ring 6, which is integral with the coupling member 5. The nails 21 have heads kept in engagement with the conical surface 3, and pointed ends on the nails 21 may by screwing together of the housing parts 1 and 2 protrude slightly from the inner surface of the clamping ring 6, as shown, whereby the nails 21 can penetrate into the wall of a tube inserted in the coupling.

The invention claimed is:

1. A coupling comprising:
a coupling housing, the coupling housing comprising:
a first housing part and a second housing part capable of being screwed together axially, each of the first housing part and the second housing part having an internal conical surface, wherein, in a position that the first housing part and the second housing part are screwed together, the inner circumference of each of the internal conical surfaces generally lessen towards outward ends thereof, respectively,
a coupling member situated in the housing for clamping a tube inserted in the coupling housing,
wherein the coupling member is influenced axially by a conical clamping ring cooperating with the conical surface in the first housing part and influences a resilient ring which causes sealing between the tube and the second housing part,
wherein one end of the coupling member is shaped as axial, flexible fingers with free ends separated by splits, and
wherein, as the first housing part and the second housing part are screwed together, the free ends of the fingers contact the resilient ring and are forced along the conical surface in the second housing part so as to force the resilient ring along the conical surface of the second housing part, whereby the resilient ring is compressed against the tube.

2. A coupling according to claim 1, wherein the conical clamping ring is integral with the coupling member.

3. A coupling according to claim 2, wherein the coupling member comprises axial, flexible fingers separated by splits in the region of the clamping ring.

4. A coupling according to claim 2, wherein the coupling member comprises slits in the circumferential direction, each extending only in a part of the circumference and being mutually displaced in the circumferential direction.

5. A coupling according to claim 2, wherein at least one of the housing parts has external threads near that end which is directed axially outwardly.

6. A coupling according to claim 1, wherein the coupling member comprises axial, flexible fingers separated by splits in the region of the clamping ring.

7. A coupling according to claim 6, wherein the fingers in the region of the clamping ring have ribs on an inner side in the circumferential direction of the coupling member.

8. A coupling according to claim 1, wherein the coupling member comprises slits in the circumferential direction, each extending only in a part of the circumference and being mutually displaced in the circumferential direction.

9. A coupling according to claim 1, wherein at least one of the housing parts has external threads near that end which is directed axially outwardly.

* * * * *